United States Patent
Stark et al.

(10) Patent No.: US 9,396,762 B2
(45) Date of Patent: Jul. 19, 2016

(54) SYSTEMS AND METHODS FOR NETWORKED MEDIA SYNCHRONIZATION

(71) Applicant: Disney Enterprises, Inc., Burbank, CA (US)

(72) Inventors: James Stark, Pasadena, CA (US); James Robertson, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 160 days.

(21) Appl. No.: 14/321,527

(22) Filed: Jul. 1, 2014

(65) Prior Publication Data
US 2016/0005439 A1    Jan. 7, 2016

(51) Int. Cl.
*H04N 5/932* (2006.01)
*H04N 5/92* (2006.01)
*G11B 27/30* (2006.01)
*G11B 27/34* (2006.01)
*H04N 7/00* (2011.01)

(52) U.S. Cl.
CPC ............ *G11B 27/3036* (2013.01); *G11B 27/34* (2013.01); *H04N 7/00* (2013.01)

(58) Field of Classification Search
CPC ................. G11B 27/3036; G11B 2020/00014; H04N 5/04; H04N 9/802
USPC ......... 386/201, 202, 241, 248, 285, 321, 323, 386/338
See application file for complete search history.

(56) References Cited

U.S. PATENT DOCUMENTS

2015/0018994 A1*  1/2015  Millington ............ H04J 3/0664
                                                                    700/94

* cited by examiner

*Primary Examiner* — Robert Chevalier
(74) *Attorney, Agent, or Firm* — Sheppard Mullin Richter & Hampton LLP (57) ABSTRACT

This disclosure illustrates systems and methods for generating synchronized audio output signals. The synchronization may be performed based on an audio synchronization message received by an audio synchronization computing platform over a communication network. The audio synchronization computing platform may generate a synchronized audio output signal from an audio signal. The audio synchronization computing platform may provide the synchronized audio output signal to one or more audio playback devices over the same communication network. The communication network may be a single ethernet network.

16 Claims, 12 Drawing Sheets

SYSTEMS AND METHODS FOR NETWORKED MEDIA SYNCHRONIZATION

FIELD OF THE DISCLOSURE

This disclosure relates to systems and methods for synchronizing and delivering multimedia content over a common communication network.

BACKGROUND

Commercial and/or personal venues such as theme parks, movie theatres, performance theatres, stages, and/or other venues use separate media playback devices to deliver multimedia content of a multimedia presentation. Multimedia presentations include, for example, visual, audio, visual effects (e.g., lighting, fog, and/or other effects), and/or other components. The audio of a multimedia presentation may be represented by an analog or digital audio signal. The audio is produced using one or more audio playback devices (e.g., a speaker) that produce sound based on the audio signal. Similarly, the visual component may be represented by an analog or digital video signal that is presented using one or more video playback devices (e.g., a display) that produce still or moving images using the video signal. Other media playback devices may produce other components of the multimedia presentation.

The media playback devices are synchronized to one another to ensure that the multimedia presentation remains coherent. The audio, visual, and/or other media signals may be communicated to the respective playback devices via separate and distinct communication channels and/or networks such that differences in channel characteristics such as speed and latency can desynchronize the component parts of a multimedia presentation. Specialized synchronization hardware may be employed at each of the media playback devices to overcome these challenges.

SUMMARY

One or more aspects of the disclosure relates to a system for generating synchronized digital media signals for one or more media components of a multimedia presentation. Synchronization and playback of the digital media signals are facilitated by a single communication network with the components of the system connected using network specific interfaces. The digital media signals comprise one or more of a digital message, a stream, a channel, a track, or a datagram communicated over the network to one or more playback devices. One or more implementations of the system are configured to generate synchronized audio output signals (e.g., an audio channel, an audio track, a digital audio message, an audio stream, or datagram containing audio of the multimedia presentation) using an audio synchronization message. The system may be configured to synchronize other digital media signals of the multimedia presentation including video signals and visual effects signals.

The system may be implemented with inexpensive general-purpose computing platforms, such as desktop computers. The communication network may employ standard network technologies such as ethernet or more specifically Audio Video Bridging (AVB). An AVB network employs technical standards in accordance with IEEE 802.1. The AVB network facilitates multimedia streaming with low latency that carries both audio and video signals using standard ethernet cabling, AVB enabled interfaces, and standard ethernet interfaces.

The audio synchronization message is introduced into the network at a single point of entry. The network delivers the audio synchronization message to one or more audio synchronization computing platforms configured to generate synchronized audio output signals. Synchronization may include tracking and resampling audio signals over many audio channels.

The audio synchronization computing platforms include one or more processors configured to execute one or more computer program components to facilitate generating the synchronized audio output signal. The computer program components may include a managing component, a receiving component, a signal generating component, an output component, and/or other components.

The managing component manages audio signals of an audio component of a multimedia presentation. The audio signals represent digital signals which, if delivered to an audio playback device absent synchronization, would not be synchronized with the concurrent playback of other components of the multimedia presentation (e.g., other audio signals or a video signal) due to inherent differences in clock rates of the audio synchronization computing platforms and other computing platforms used to deliver the various media signals to the media playback devices. Thus, synchronization of the audio signals with other components of the multimedia presentation is desired.

The receiving component receives an audio synchronization message. The audio synchronization message includes information related to the timing of at least one other component of the multimedia presentation. For example, the audio synchronization message may include information related to the timing of a visual component represented by a video signal (e.g., a video channel, a video track, a digital video message, a video stream, or datagram containing the visual of the multimedia presentation).

In this manner, the signal generating component generates an audio output signal that is synchronized with the visual component or other component of the multimedia presentation. Synchronization may be accomplished by resampling the audio signals based on information in the received audio synchronization message.

The output component provides the synchronized audio output signal to one or more audio playback devices over the network. The audio playback devices may be physically separate from the one or more audio synchronization computing platforms or the audio playback devices may be integrated with the audio synchronization computing platforms. The audio output signal played by the one or more audio playback devices is synchronized with video playback of the video signal.

DETAILED DESCRIPTION

Figure 1:
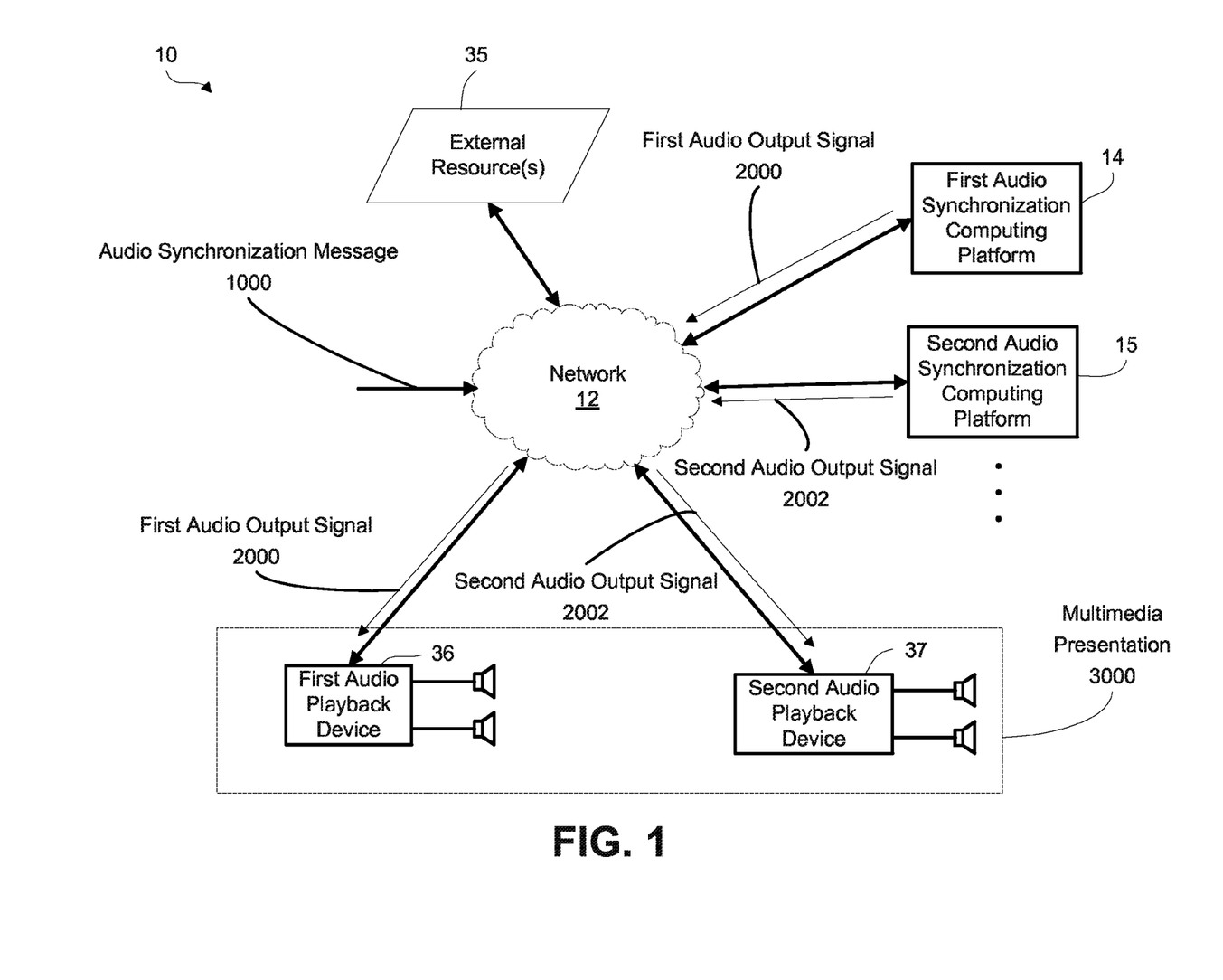
FIG. 1 illustrates a system for generating synchronized audio output signals, in accordance with one or more implementations.

FIG. 1 illustrates a system 10 for generating synchronized audio output signals (e.g., first audio output signal 2000 and second audio output signal 2002) and/or other synchronized digital media signals included as part of a multimedia presentation 3000. The multimedia presentation 3000 may be a presentation used in a venue such as a theme park, a movie theatre, a live performance theatre, a stage, and/or other venue. The multimedia presentation 3000 is facilitated by one or more audio playback devices (e.g., first audio playback device 36 and/or second audio playback device 37), one or more video playback devices (not shown in FIG. 1), one or more visual effects devices (not shown in FIG. 1), and/or one or more other media playback devices. The audio playback devices may comprise individual speakers or speaker pairs. The video playback devices may comprise a display such as a video screen, projector, and/or other video playback enabled device.

An audio component of the multimedia presentation 3000 is associated with one or more audio signals stored by or provided to a first audio synchronization computing platform 14, a second audio synchronization computing platform 15, and/or other computing platforms. Absent synchronization, delivering the audio signals to one or more audio playback devices for playback may inherently result in unsynchronized playback of the audio with other components of the multimedia presentation 3000 due to variances in clock rates between the audio synchronization computing platforms and other computing platforms that are used to deliver other media signals to playback devices. Thus, synchronization is desired. The audio signals may comprise one or more of a music track, a dialogue track, a commentary track, and/or other audio track included as part of the audio component of the multimedia presentation 3000 that are otherwise unsynchronized with the visual component or other component (e.g., visual effects).

The visual component of the multimedia presentation 3000 is associated with one or more video signals. The video signals may have characteristics such as sample rate, event times, and/or sample times that differ from the sample rate, event times, and/or sample times of the audio signals or other video signals. In some implementations, the characteristics of the video signals provide timing information that is extracted and included in an audio synchronization message 1000. The audio synchronization message 1000 provides the basis for synchronizing the audio signals with the video signals through communications facilitated over the communication network 12. Synchronizing is performed to compensate for miss-match between characteristics of the visual component, audio component, and/or visual effects component of the multimedia presentation 3000.

Figure 7:
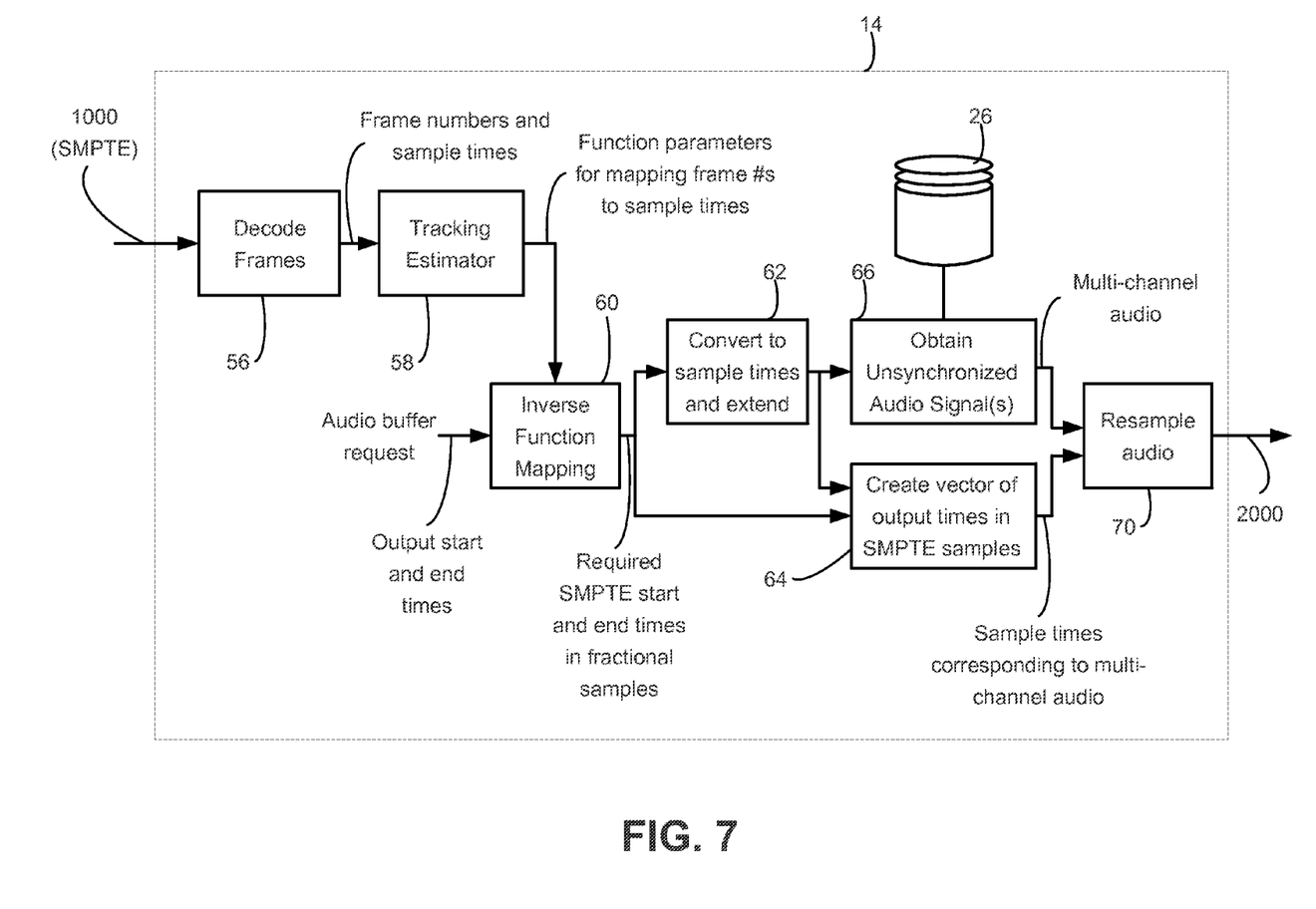
FIG. 7 illustrates a process flow diagram for generating a synchronized audio output signal using an audio synchronization computing platform, in accordance with one or more implementations.

Synchronization of the audio signals may be based on a resampling of the audio signals in accordance with the timing information audio synchronization message 1000 (see, e.g., FIG. 7). Synchronization may be based on aligning the audio signals with the video signal and/or other signals of other components of multimedia presentation 3000. Alignment is facilitated by adding or removing delay in the timing of the respective signals.

Although the system 10 may be implemented with special-purpose computing platforms, the system 10 may be implemented using general purpose computing platforms and/or other processing devices (e.g., a desktop computer), which provides a cost effective solution for audio synchronization. For example, the first audio synchronization computing platform 14 and the second audio synchronization computing platform 15 may be special-purpose computing platforms, general purpose computing platforms, and/or other processing devises configured to perform synchronization of the audio signals as presented herein. The system 10 may incorporate additional features such as interactivity with the multimedia presentation 3000, audio mixing, and/or other functions. The system 10 may be configured to track and/or resample the audio signals for synchronization over many audio channels.

The network 12 is configured to facilitate communication based on any available network infrastructure and protocols, for example, IPv4/IPv6 over ethernet, packet switched networks, stream reservation protocol (SRP), and/or other protocol and/or network technologies. In some implementations, the network 12 is a single ethernet network that is connected to the playback devices and computing platforms employed in system 10. The use of a single ethernet network for communications for both media playback and media synchronization alleviates speed and latency problems associated with having the playback devices and computing platforms used for media synchronization connected via separate and distinct communication channels and/or networks.

The audio synchronization message 1000 is used by the first audio synchronization computing platform 14 and the second audio synchronization platform 15 to generate the first audio output signal 2000 and the second audio output signal 2002, respectively. However, implementations of system 10 using only the first audio synchronization computing platform 14 are also contemplated and shown and described with reference made to FIG. 5, FIG. 6, and FIG. 7.

Returning to FIG. 1, the first audio output signal 2000 generated by the first audio synchronization computing platform 14 is a synchronization of a first audio signal (not shown in FIG. 1) that is stored by or provided to the first audio synchronization computing platform 14. For example, the first audio signal may be a music track for the multimedia presentation 3000. The first audio output signal 2000 may be the music track synchronized to the visual component (e.g., a video) or other component of the multimedia presentation 3000 based on the audio synchronization message 1000. The first audio output signal 2000 may be provided to the first audio playback device 36 configured to produce sound of the music track using the first audio output signal 2000. The first playback device 36 may be addressable, such that first audio synchronization computing platform 14 includes an address (e.g., a network address) with the first audio output signal 2000 that directs the signal to the addressed first audio playback device 36.

In some implementations, the second audio output signal 2002, generated by the second audio synchronization computing platform 15, is a synchronization of a second audio signal (not shown in FIG. 1) that is stored by or provided to the second audio synchronization computing platform 15. For example, the second audio signal may be a dialogue track for the multimedia presentation 3000. The second audio output signal 2002 may be the dialogue track synchronized to the visual component (e.g., a video) or other component of the multimedia presentation 3000 based on the audio synchronization message 1000. The second audio output signal 2002 may be provided to the second audio playback device 37 configured to produce sound of the dialogue track using the second audio output signal 2002. The second playback device 37 may be addressable such that second audio synchronization computing platform 15 includes an address (e.g., a network address) with the second audio output signal 2002 that directs the signal to the addressed second audio playback device 37.

Figure 3:
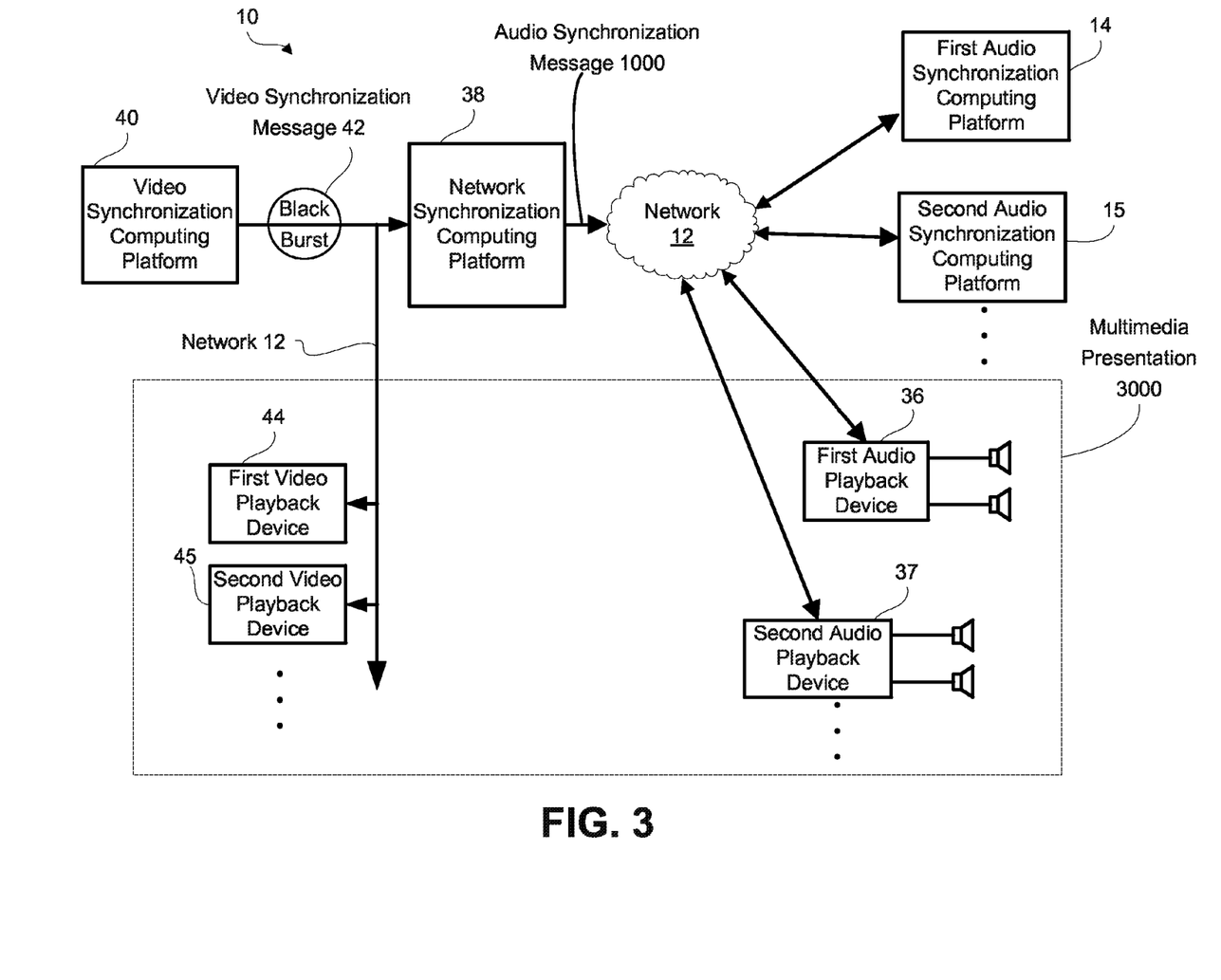
FIG. 3 illustrates the system for generating synchronized audio output signals, in accordance with one or more implementations.

In some implementations, the audio synchronization message 1000 may be generated based on a video synchronization message (e.g., video synchronization message 42 shown in FIG. 3) and/or other media synchronization messages. The system 10 shown in FIG. 3 provides similar audio synchronization capabilities as the system 10 shown in FIG. 1, however, also including a video synchronization computing platform 40 configured to generate and/or otherwise provide a video synchronization message 42 and a network synchronization computing platform 38 configured to generate the audio synchronization message 1000 from the video synchronization message 42. The system 10 in FIG. 3 also includes a first video playback device 44 and a second video playback device 45 that facilitate video playback of the visual component of the multimedia presentation 3000.

The video synchronization message 42 provides information related to the timing of a video signal and may include other information. In a particular example, the video synchronization message 42 provided by the video synchronization computing platform 40 is a bi-level video synchronization message such as a black-burst signal and/or other signal. Alternatively, the video synchronization message 42 may be a tri-level video synchronization message and/or other video synchronization message. In some implementations, the video synchronization message 42 may be a digital message that includes vertical synchronization timing or a digital message from which vertical synchronization timing can be extracted. In some implementations, the video synchronization message 42 may be related to a "house sync" signal and/or other digital signal suitable for a particular application.

In some implementations, the network synchronization computing platform 38 is a packet computing platform configured to receive the video synchronization message 42 and process the video synchronization message 42 to generate the audio synchronization message 1000. Processing of the video synchronization message 42 includes extract timing information (e.g., extracting timecodes for individual frames of a video). In this manner, the audio synchronization message 1000 comprises the extracted timing information and may include other information. The network synchronization computing platform 38 may include one or more of a digital processor, an analog processor, a digital circuit designed to process information, an analog circuit designed to process information, a state machine, and/or other mechanisms for electronically processing the video synchronization message 42 to extract timing information.

Once the timing information is extracted from the video synchronization message 42, the audio synchronization message 1000 is generated and provided to the first audio synchronization computing platform 14 and the second audio sync computing platform 15, and synchronized audio output signals are generated and provided to the audio playback devices (36, 37) for playback. The video synchronization message 42 is provided (e.g., via network 12) to the first video playback device 44 and/or second video playback device 45 such that the visual component is played back synchronously with the audio component.

Returning to FIG. 1, in some implementations, the audio synchronization message 1000 is a timecode that is provided directly into the network 12 (e.g., without extraction from a video synchronization message). The timecode may be provided to the network 12 as a digital message from an external resource (e.g., a computing platform configured to generate and/or provide the timecode to the system 10). The timecode includes information related to the timing of one or more of the components of the multimedia presentation 3000 (e.g., visual component, audio component, all components, and/or other component). The timecode may include information related to hours, minutes, and/or seconds related to a duration and/or run time of a video. The timecode may include or may be accompanied by information related to individual frames of the video, such as a sequential frame number for individual ones of the frames. Therefor the individual frames may be labeled with the timecode. By virtue of the audio synchronization message 1000 including a timecode for individual frames, the audio synchronization computing platforms (14, 15) may be able to align audio signals with the video signals, such that the display of digital images and/or video may be in a frame-by-frame synchronization with the production of sound that corresponds to the images and/or video display. The timecode may be a standardized digital message that labels individual frames of video with a time (e.g., based on time from a start of the video and/or a time remaining till the end of the video) defined by the Society of Motion Picture and Television Engineers (SMPTE).

An SMPTE timecode includes values for hour, minute, second, and frame identification for each frame in a video. The hour, minute, and second identification may represent a temporal location of an individual frame based on a countdown to the end of video or a time from the start of the video. The frame identification comprises a sequential frame number of the individual frames. The timecode is encoded as metadata in a video signal and provided as binary-coded decimal characters. For example, each decimal number may be represented by a fixed number of bits, such as four or eight bits. The timecode typically follows a format comprising HH:MM:SS:FF (hour:minute:second:frame); however, modifications to the format are known and may be employed. The timecode for a video may be generated and provided to the system 10 as a continuous stream of sequential data values.

Figure 2:
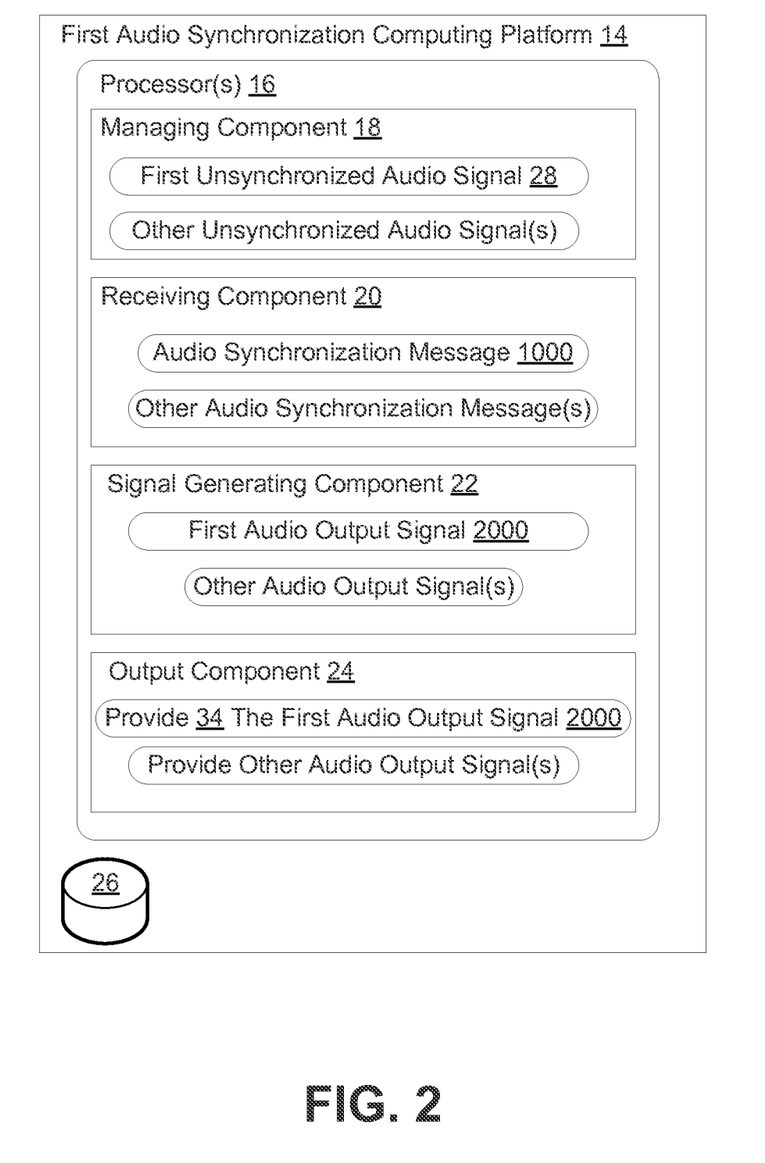
FIG. 2 illustrates an audio synchronization computing platform used in the system of FIG. 1, in accordance with one or more implementations.

FIG. 2 illustrates an implementation of the first audio synchronization computing platform 14 performing synchronization of a first audio signal 28, in accordance with one or more implementations. The first audio synchronization computing platform 14 may include one or more processors 16 configured to execute computer program components for generating synchronized audio output signals for playback on one or more audio playback devices. The computer program components may include one or more of a managing component 18, a receiving component 20, a signal generating component 22, an output component 24, and/or other components. The first audio synchronization computing platform 14 may include data storage 26.

The first audio synchronization computing platform 14 may include communication lines or ports to enable the exchange of information with the network 12 and/or other computing platforms connected to the network 12. Illustration of the first audio synchronization computing platform 14 in FIG. 2 is not intended to be limiting. The first audio synchronization computing platform 14 may include a plurality of hardware, software, and/or firmware components operating together to provide the functionality attributed herein to the first audio synchronization computing platform 14.

Data storage 26 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Data storage 26 may store files, software algorithms, information determined by processor 16, information received from the network 12 (FIG. 1) and/or other information that enables the first audio synchronization computing platform 14 to function as described. It is noted that the second audio synchronization computing platform 15 (FIG. 1) and/or other audio synchronization computing platforms used in the system 10 may be similarly configured to perform the same or similar functions as those attributed to the first audio synchronization computing platform 14.

Processor(s) 16 are configured to provide data processing capabilities in the first audio synchronization computing platform 14. Although processor 16 is shown in FIG. 2 as a single entity, in some implementations, processor 16 may include one or more processing units. The processor 16 may be configured to execute code that implements components 18, 20, 22, and 24. The processor 16 may be configured to execute code that implements components 18, 20, 22, and 24 by software; hardware; firmware; some combination of software, hardware, and/or firmware; and/or other mechanisms for configuring processing capabilities on processor 14.

In FIG. 2, the managing component 18 is configured to manage audio signals related to an audio component of a multimedia presentation. Managing audio signals may include, without limitation, receiving the audio signals, storing the audio signals, and/or providing the audio signals to the signal generating component 22. The audio signals are stored in data storage 26 and/or in an external storage location.

As an illustrative example, managing component 18 is configured to manage a first audio signal 28. The first audio signal 28 may comprise at least part of an audio component of the multimedia presentation (e.g., an unsynchronized music track).

The receiving component 20 is configured to receive the audio synchronization message 1000. The received audio synchronization message 1000 includes information related to the timing of the video signal related to the visual component of the multimedia presentation. The audio synchronization message 1000 is received by the first audio synchronization computing platform 14 (e.g., receiving component 20) via the network 12 (FIG. 1).

In this manner, the signal generating component 22 is configured to generate the first audio output signal 2000 that is a digital audio signal synchronized with the video signal of the visual component of the multimedia presentation and/or other media component of the multimedia presentation. Generating the first audio output signal 2000 may be accomplished by resampling the first audio signal 28 in accordance with the audio synchronization message 1000. Example audio output signal sample rates include 48 kHz, 44.1 kHz, and 96 kHz. The signal generating component 22 may generate audio output signals having up to 2% (98-102%) sample rate deviation. Observed deviations between clock rates are typically less than 0.1%, and often below 0.01%. Implementations may accommodate larger rate deviations in order to handle fluctuations, adverse conditions, and the transitional period when clock synchronization is being established.

Generating the first audio output signal 2000 may be accomplished by aligning the audio signals with audio synchronization message 1000 such that the first audio output signal 2000 is synchronization with the video signal and/or other signals of other components of the multimedia presentation.

The output component 24 is configured to provide the first audio output signal 2000 to the first audio playback devices 36 (FIG. 1) and/or other audio playback devices. The first audio output signal 2000 is provided to the first audio playback device 36 over the same communication network 12 that the audio synchronization message 1000 was received from. The first audio output signal 2000 may be provided as a digital audio message, an audio track, an audio channel, or a datagram that is communicated over the network 12.

Figure 4:
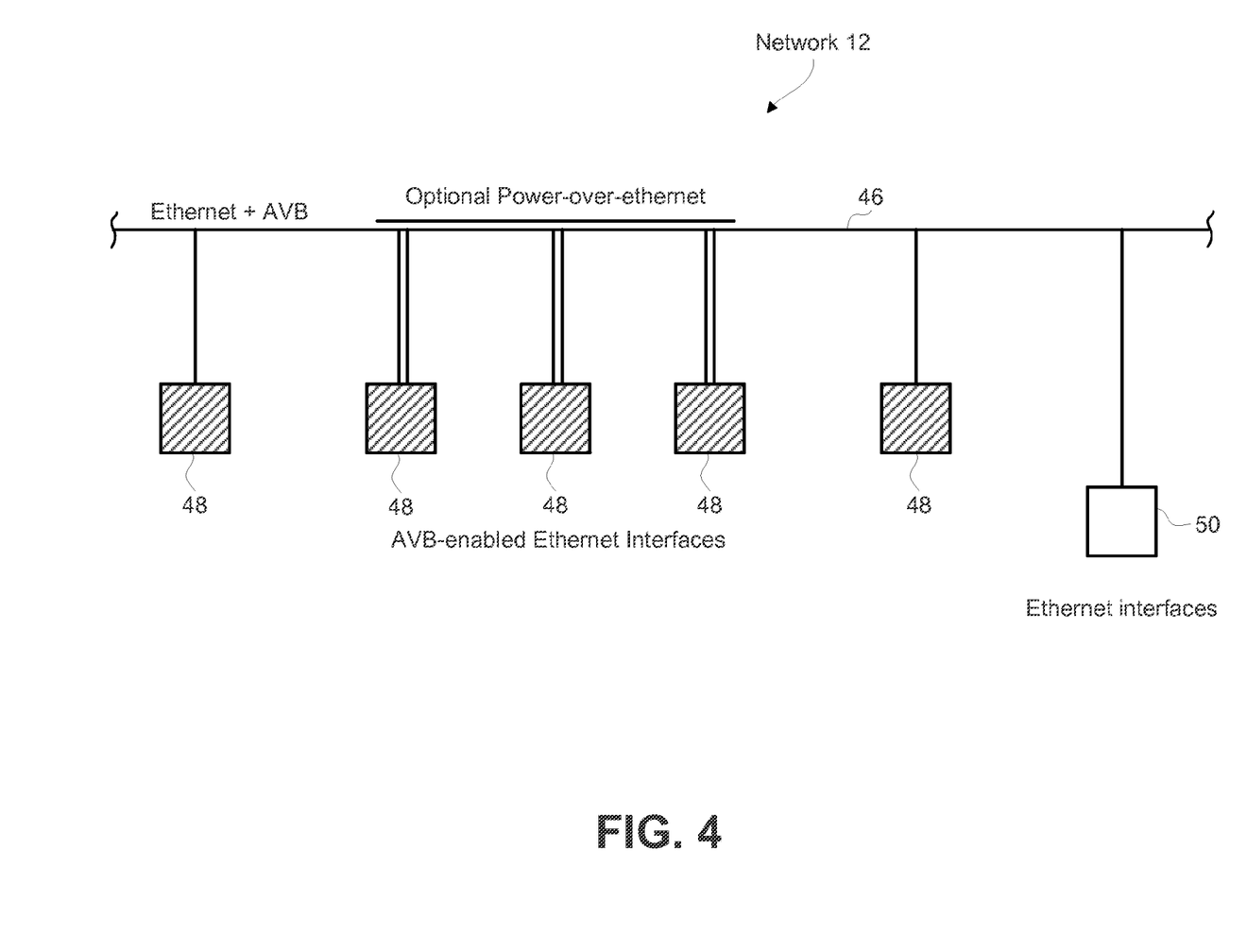
FIG. 4 illustrates a network used in the system for generating synchronized audio output signals, in accordance with one or more implementations.

FIG. 4 illustrates an implementation of network 12 as an audio-over-ethernet (AoE) network. The network 12 may be based on Audio Video Bridging (AVB) communication standards, Dante, HDBaseT network, and/or other network standards or protocols. The network 12 is constructed using standard cabling 46 configured to connect to standard ethernet interfaces, such as AVB-enabled ethernet interfaces 48 and/or other ethernet interfaces 50. AVB-enabled network switches and/or AVB-enabled ethernet interfaces 48 transport audio-visual information and control signals alongside ethernet packets. The cabling 46 may be combined with power-over-ethernet (PoE), eliminating power cabling where appropriate.

Figure 5:
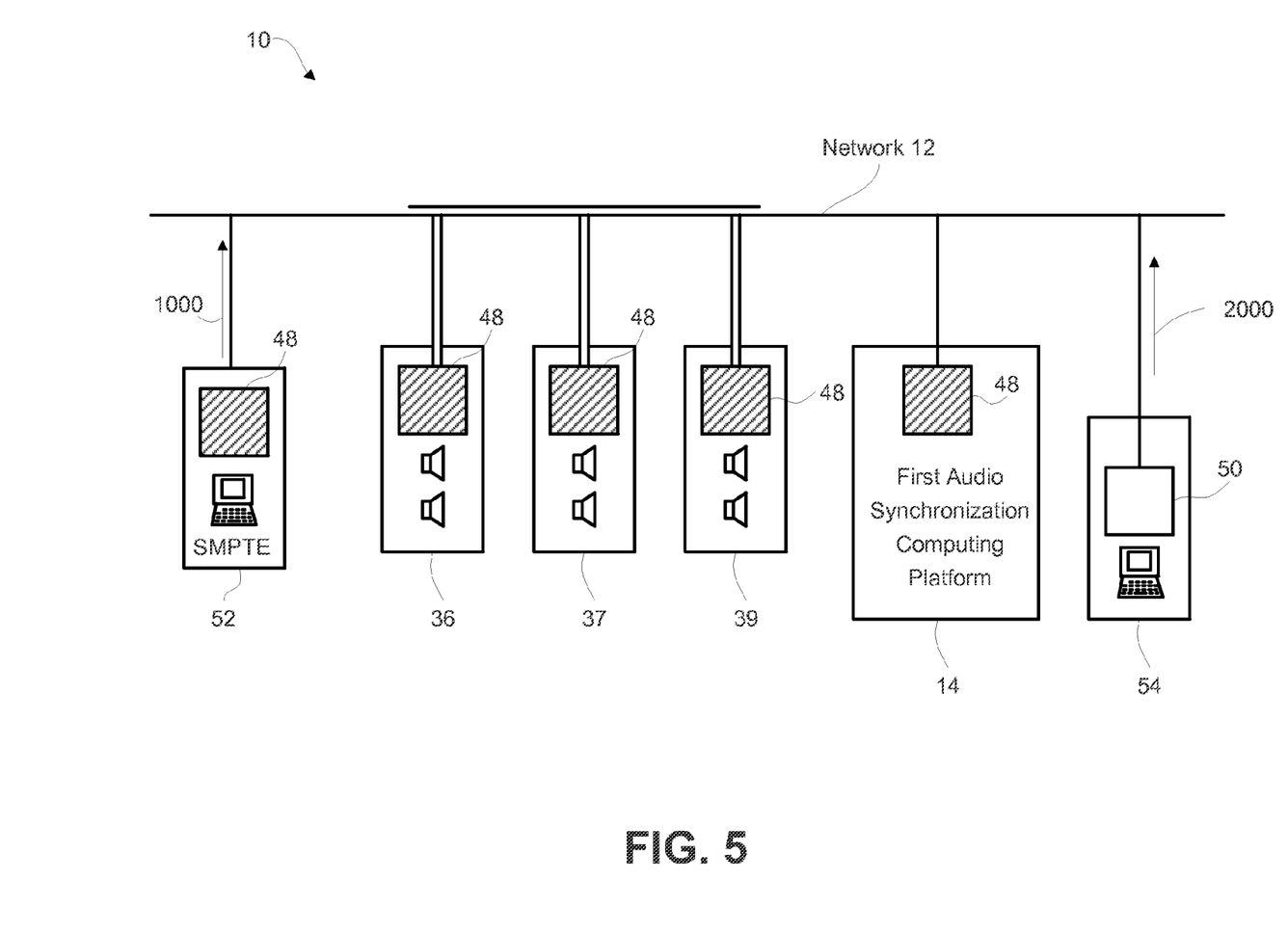
FIG. 5 illustrates the system for generating synchronized audio output signals, in accordance with one or more implementations.

FIG. 5 illustrates an implementation of the system 10 for generating an audio output signal (e.g., first audio output signal 2000) using the network 12 as illustrated in FIG. 4. The system 10 in FIG. 5 employs an audio synchronization computing platform (e.g., first audio synchronization computing platform 14) and provides the first audio output signal 2000 to multiple audio playback devices (e.g., the first audio playback device 36, the second audio playback device 35, and/or a third audio playback device 39). A first computing platform 52 is configured to provide the audio synchronization message 1000 to the network 12. The first computing platform 52 provides a SMPTE and/or other timecode as the first audio synchronization message 1000. Synchronization using an SMPTE timecode is described in detail with reference to FIG. 7.

Returning to FIG. 5, the one or more audio playback devices may be connected to network 12 via AVB-enabled ethernet interfaces 48. A second computing platform 54 may be permanently or temporarily connected to network 12 via a standard ethernet interface 50. The second computing platform 54 updates content, monitors the audio processing by the first audio synchronization computing platform 14, and/or performs more or less operations.

Figure 6:
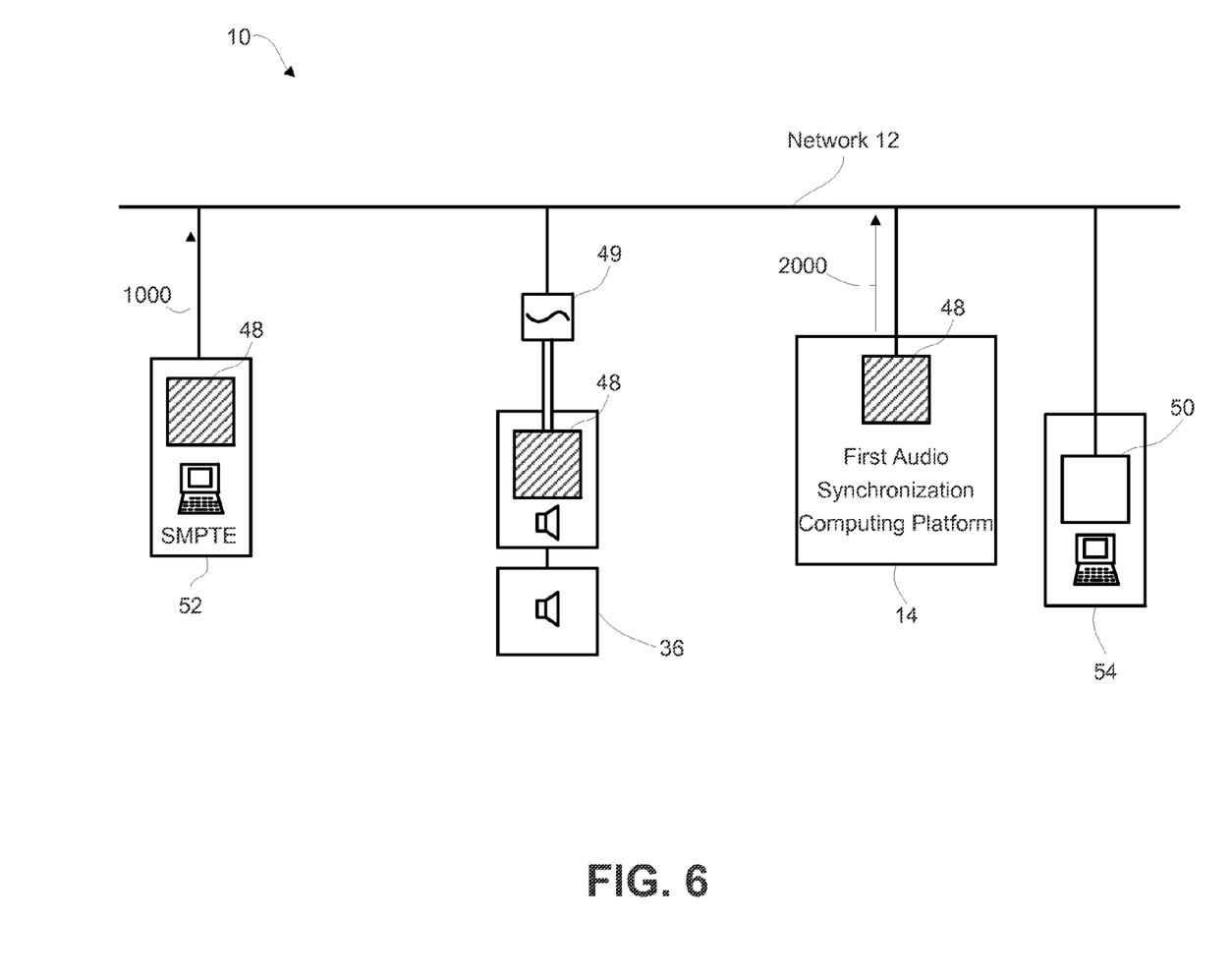
FIG. 6 illustrates the system for generating synchronized audio output signals, in accordance with one or more implementations.

FIG. 6 illustrates another implementation of system 10 using an AVB-enabled audio playback device (e.g., first audio playback device 36) connected to network 12 via a power-over-ethernet injector 49. The first computing platform 52 is configured to provide the audio synchronization message 1000 to network 12 as an SMPTE timecode and/or other timecode. The audio synchronization message 1000 is provided to network 12 by an AVB I/O board. The second computing platform 54 is connected to network 12 via the standard ethernet interface 50. The second computing platform 54 is configured to show the controls for the first audio synchronization computing platform 14. The first audio playback device 36 may be a single speaker or a speaker pair (as shown).

FIG. 7 illustrates a process flow diagram for generating the first audio output signal 2000 based on the audio synchronization message 1000 being an SMPTE timecode. The audio synchronization message 1000 is provided to the first audio synchronization computing platform 14 over an audio input of the first audio synchronization computing platform 14. The SMPTE timecode is first decoded 56 to determine frame codes. In any given buffer of input data, the (ends of) multiple frame codes may be encountered, and each frame code may have a sample position and frame number. This number is adjusted for drop-frame coding, resulting in an absolute and sequential SMPTE frame number. A tracking estimator 58 generates a parameterized mapping from the frame numbers to absolute sample times. To do so, the tracking estimator 58 smooths out statistical variations in the frame code signal positions. Next, using inverse functional mapping 60 obtained by tracking the SMPTE input, the sample times for the end of the buffer are converted 62 into SMPTE-based time. This process may "remember" the SMPTE-based time for the end of the previous buffer, which serves as the beginning time for the current buffer. These beginning and end times are fractional. The beginning and end times are rounded and extended in order to determine what audio data is needed. Extension before and after is required because the subsequent low-pass interpolation process requires input data spanning either side of each output sample. Audio signals are obtained 66 from data storage 26, and/or other resource. A corresponding vector of SMPTE-based fractional output times is created 64. These values may range between the beginning and end times and each one may correspond to an output sample point. These values are fed into a resampler 70, which is detailed in FIG. 8, in accordance with one or more implementations.

Figures 8, 8A:
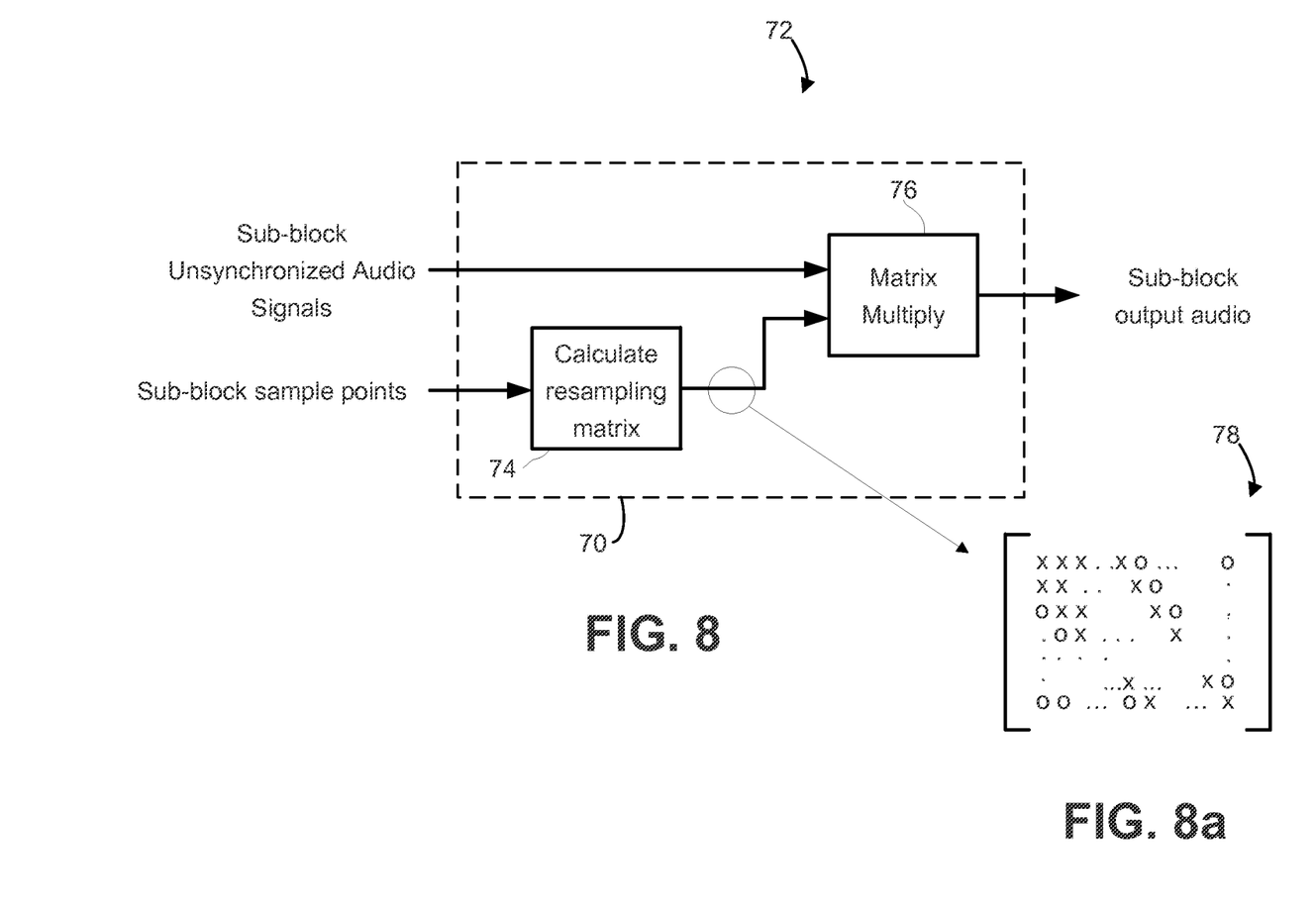
FIG. 8 illustrates a process flow diagram for resampling audio signals using matrix multiplication to provide a synchronized audio output signal, in accordance with one or more implementations.
FIG. 8*a* illustrates an exemplary matrix used for the resampling process shown in FIG. 8, in accordance with one or more implementations.

FIG. 8 illustrates a process flow diagram 72 for resampling audio signals using matrix multiplication. The resampler 70 operates on sub-blocks. The resampler 70 processes 512 output (multi-channel) points (or other amount of output points), but may generate 64 output points (or other amount of output points) in 4 blocks. The resampling is performed using matrix multiplication 76. The matrix multiplication 76 is associated with highly optimized routines. The matrix may be unique for each set of output time points. The matrix has a notable structure in that parts of it have zero entries. The zero entries are in two approximately triangular areas (these may result from the shifting and padding shown in FIG. 9). Therefore the matrix multiplication 76 may waste work by multiplying by values that are knowably zero. If the sub-blocks are large, this wasted effort is significant. However, the speed improvement provided by cache-optimized multi-core routines may outweigh the inefficiency of wasted effort. FIG. 8a illustrates an exemplary form of a matrix 78 used for the resampling.

Figure 9:
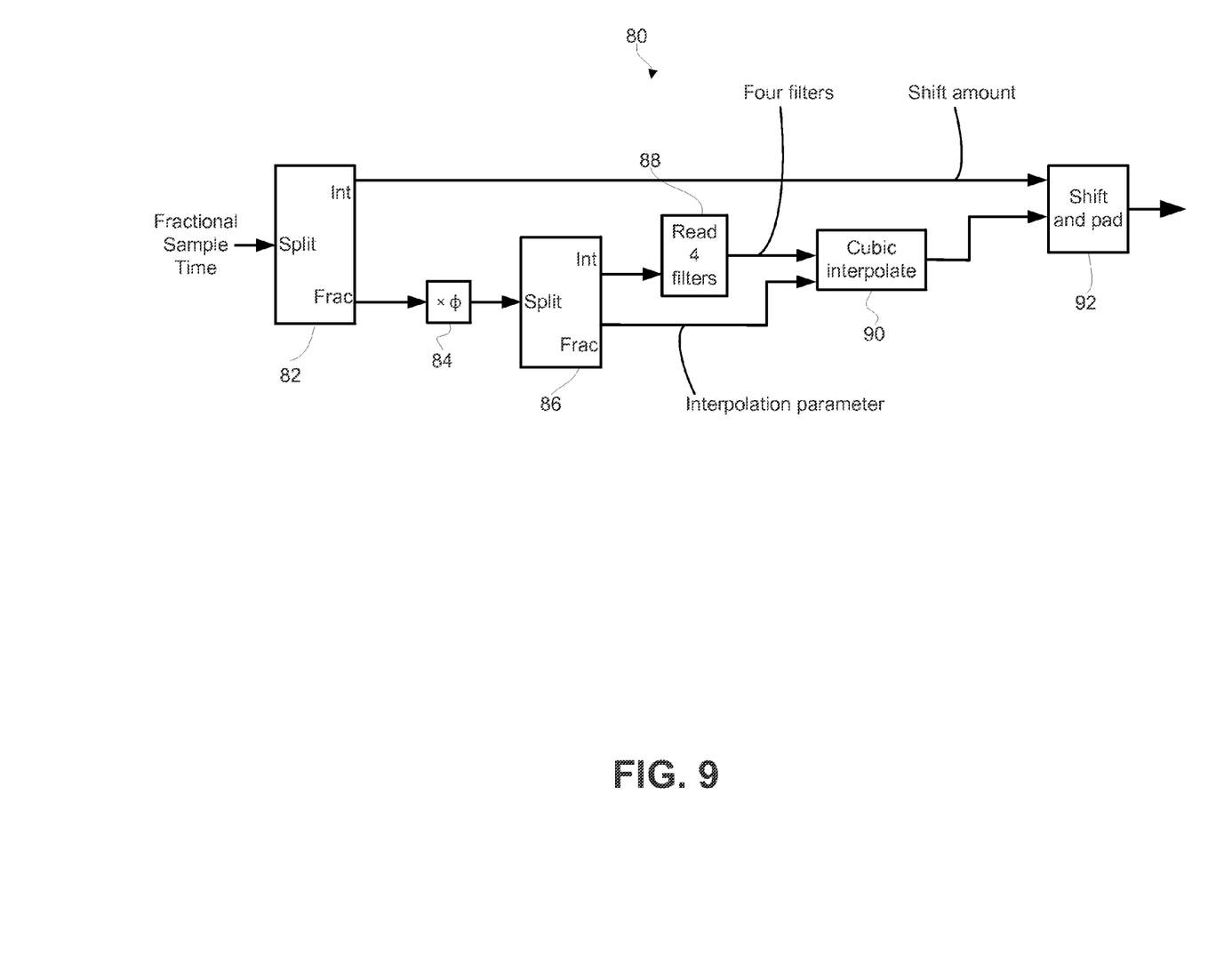
FIG. 9 illustrates a process flow diagram for calculating a matrix used in the process of FIG. 8, in accordance with one or more implementations.

FIG. 9 illustrates a process flow diagram 80 for calculating a matrix used in the resampling process of FIG. 8, under one or more implementations. The diagram 80 represents a method for obtaining a single row in the matrix. The fractional sample times are split 82 into integer and fractional parts. The fractional part is multiplied by a constant 84 such as "ϕ=8", which implicitly up-samples the input data. The result is again split 86 into integer and fractional parts. Filters 88 are pre-designed such that, if the resulting fractional part were zero, the integer part would correspond to one of ϕ output sample points spaced equally by 1/ϕ from the nearest previous input sample point up to, but not including, the next sample point. Four such filters 88 are obtained. The first filter is one used if the fractional part were zero. A preceding and two following filters are also obtained. The filters are combined, tap by tap, using cubic interpolation 90 between the three filters. The filters are shorter than the full range of input samples, and are shifted with zero padding 92 according to the integer part of the output sample time. There may be a trade-off associated with the choice of ϕ. With higher values (more up-sampling), the resampling may have better quality and shorter filters may be used. However, the filter bank, from which each set of 4 filters are obtained, becomes larger and may not fit in the fastest cache, which may cause degraded speed performance.

Figure 10:
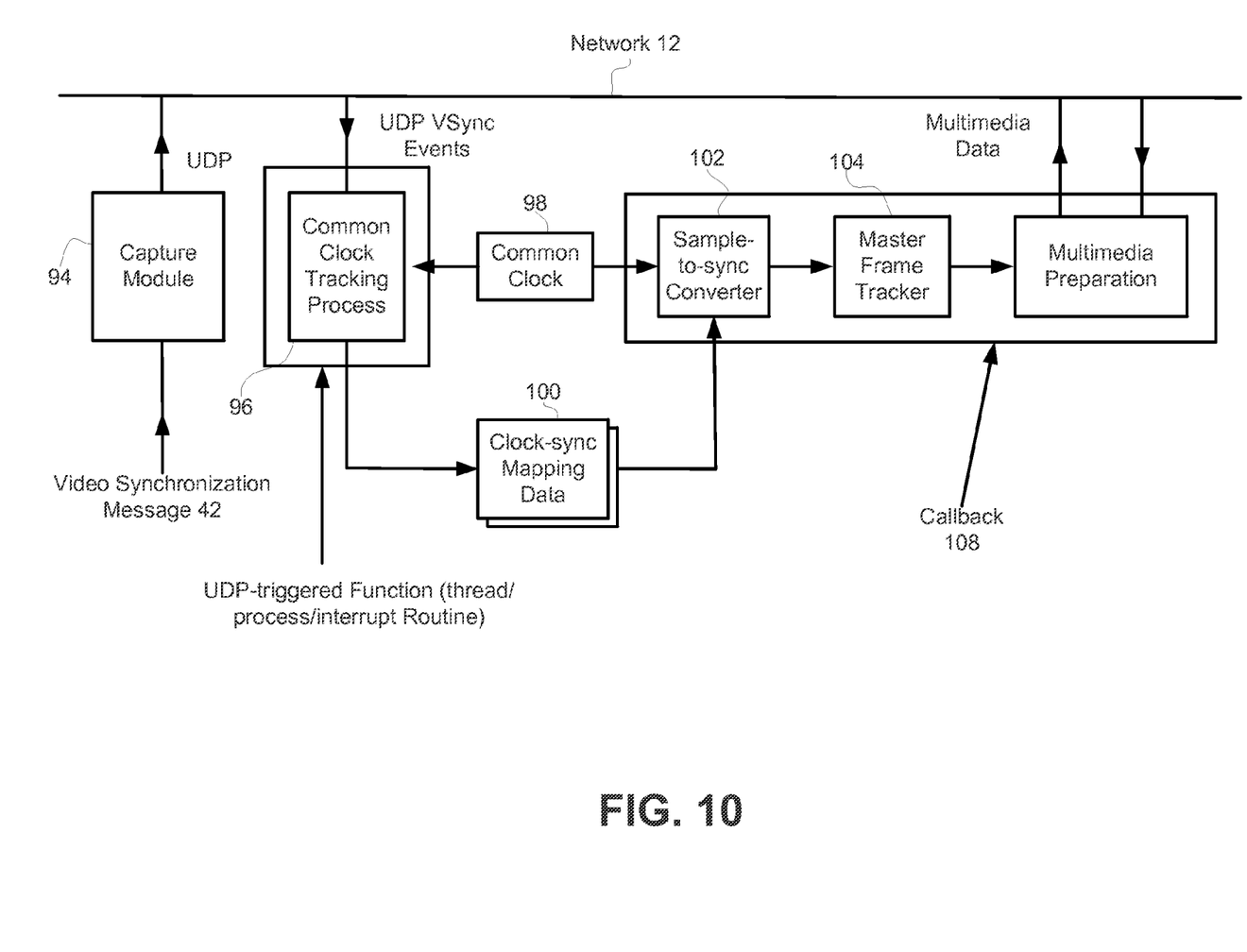
FIG. 10 illustrates a process flow diagram for delivering multimedia content that is synchronized with a digital video synchronization message.

FIG. 10 illustrates a process flow diagram for delivering multimedia content synchronized with the video synchronization message 42. A capture module 94 is configured to create network events when it detects the video synchronization message 42. The events are sent to the network 12 as user datagram protocol (UDP) packets. The packets have sequential numbers. A thread (or similar routine) processes incoming UDP packets by tracking 96 their arrival times against a common clock 98. This may be a CPU clock and/or a network precision time protocol (PTP) clock. The tracker smooths out the statistically varying arrival times. The mapping parameters 100 are saved in shared mutexed memory. Requests for multimedia data are invoked in calls to a callback function 108. This function 108 requests the common clock time and maps 102 that to the video frame number. The result is a fractional sync position associated with the output sample position (relative to the UDP packet sequence number). If the common clock is not precisely aligned with the time of the requested output data, such as a PTP time associated with audio delivery, then the mapped request time is tracked 104 so statistical variations may be smoothed out.

Figure 11:
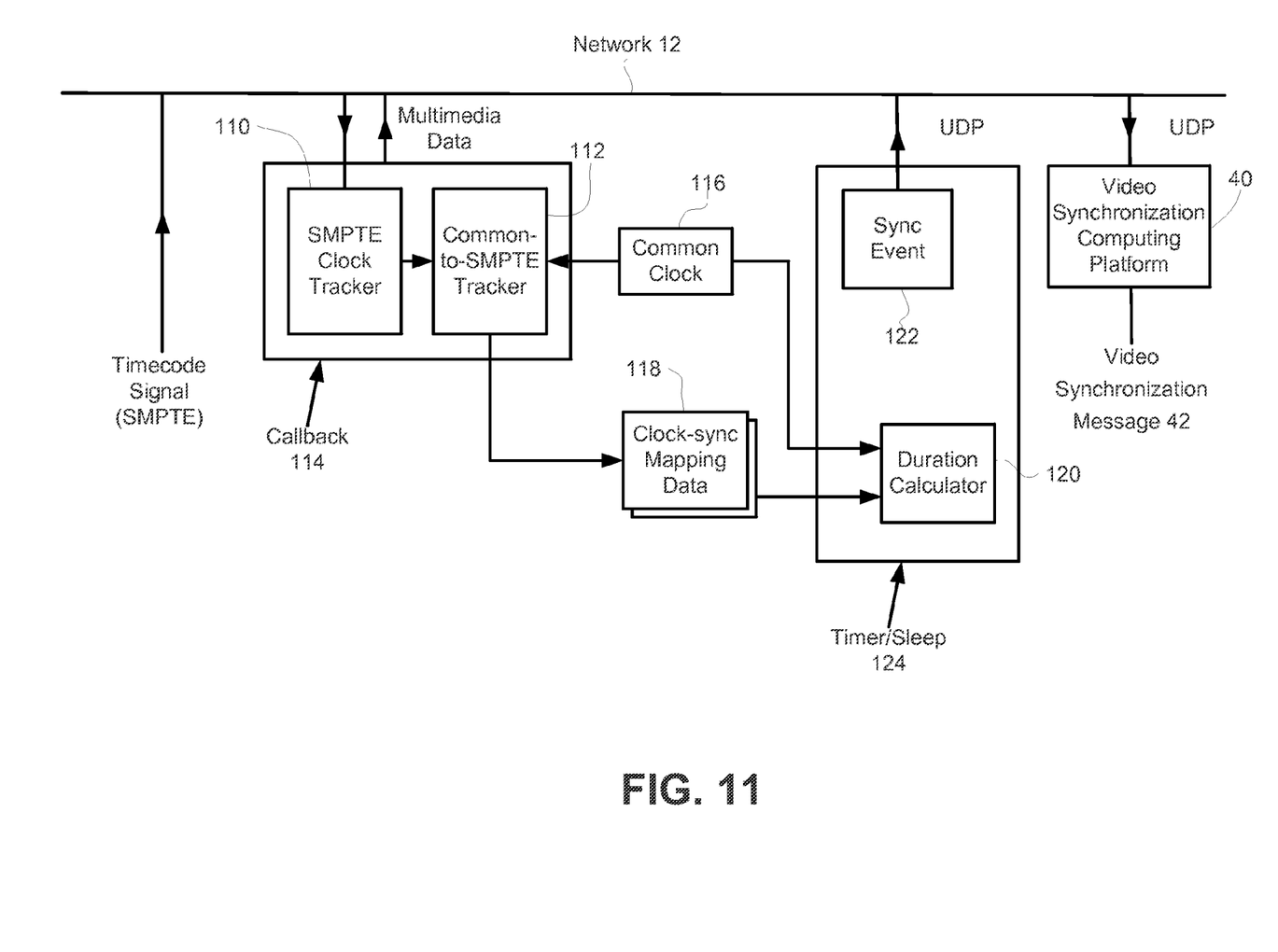
FIG. 11 illustrates a process flow diagram for generating a video synchronization message that is synchronized with another audio synchronization message.

FIG. 11 illustrates a process flow diagram for generating the video synchronization message 42 synchronized with an SMPTE or other timecode. The timecode is delivered to the network 12 as a digital audio message. A computing platform performs a callback function 114 that accepts input multimedia data and delivers output multimedia data. A tracking process 110 follows the timecode to smooth out statistical variations arising from an estimation of frame positions. A second part of callback function 114 uses the time given by a common clock 116, such as the CPU clock or a network PTP clock. Variations in the requests and processing of these clock times may exist, and their values are subject to statistical variations. This second part therefore tracks the common clock 112 and creates a mapping 118 between the clock and the timecode. The mapping 118 is stored in shared mutexed memory. A further routine 124 is invoked at controlled intervals, such as via a timer or thread sleep times. When this wakes up, the routine 124 sends a network event 122, such as a UDP packet. In some other part of the network, a component, such as the video synchronization computing platform 40, generates a signal that has synchronization events whenever a UDP packet is received. The routine 124 that sent the network event obtains the time 120 from the common clock. The routine 124 maps this onto a synchronization time and smooths the result. The routine 124 uses this time to adjust the time that the thread should sleep before sending the next synchronization request.

Returning to FIG. 1, the first audio synchronization computing platform 14, the second audio synchronization computing platform 15, the first audio playback device 36, the second audio playback device 37, external resources 35, and/or other components may be operatively linked via one or more electronic communication links. Such electronic communication links may be established via network 12 such as a single ethernet network as presented. It will be appreciated this is not intended to be limiting, and that this disclosure includes implementations in which the first audio synchronization computing platform 14, the second audio synchronization computing platform, the first audio playback device 36, the second audio playback device 37, external resources 35, and/or other components may be operatively linked via some other communication media.

The external resources 35 include resources of information, external entities participating with system 10, and/or other resources. In some implementations, some or all of the functionality attributed to external resources 35 may be provided by resources in system 10.

Figure 12:
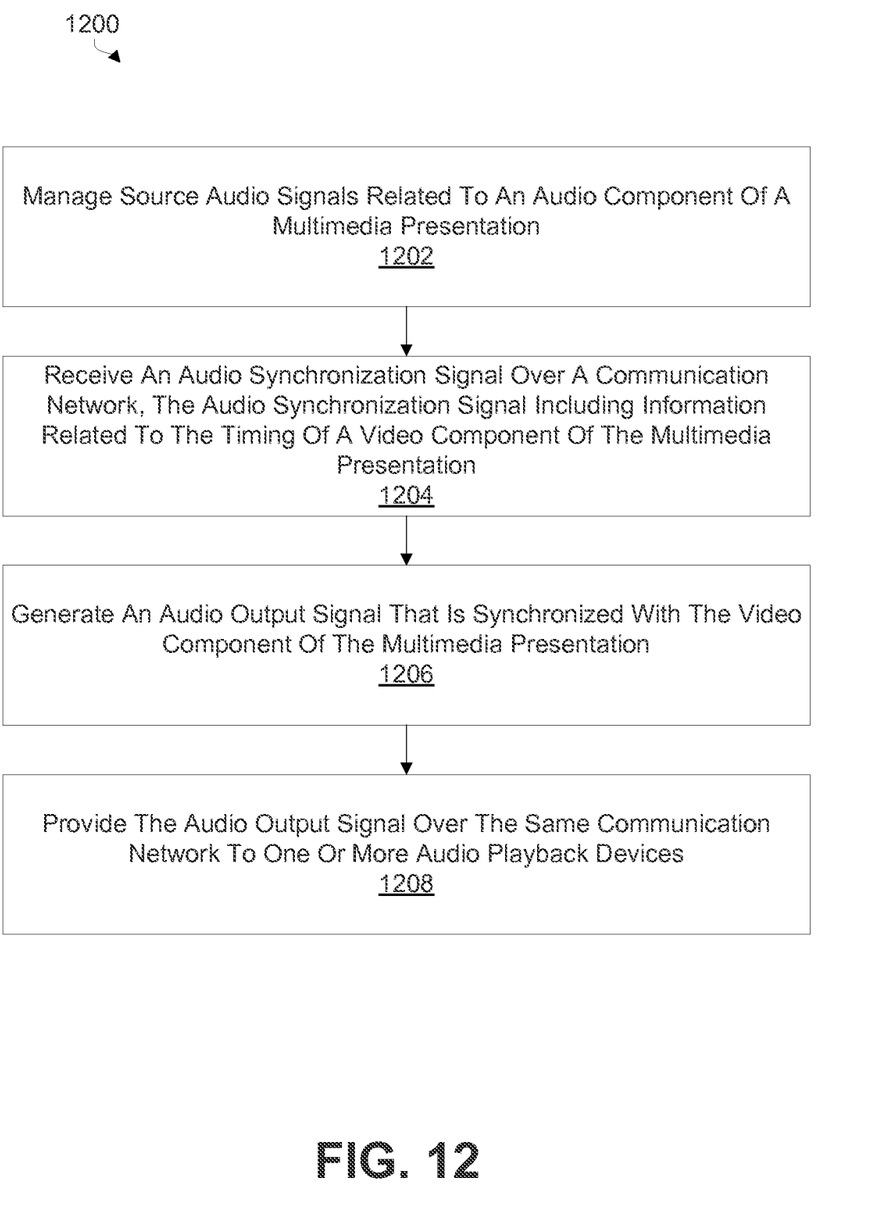
FIG. 12 illustrates a method of generating synchronized audio output signals, in accordance with one or more implementations.

FIG. 12 illustrates a method 1200 of generating synchronized audio output signals, under one or more implementations. The operations of method 1200 presented below are illustrative. In some implementations, method 1200 may be accomplished with one or more additional operations not described, and/or without one or more of the operations discussed. The order in which the operations of method 1200 are illustrated in FIG. 12 and described below are not intended to be limiting.

In some implementations, method 1200 is implemented in one or more processing devices (e.g., a digital processor, an analog processor, a digital circuit designed to process information, an analog circuit designed to process information, a state machine, and/or other mechanisms for electronically processing information), and/or one or more other components. The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

Referring now to method 1200 in FIG. 12, at an operation 1202, audio signals related to an audio component of a multimedia presentation are managed. Managing audio signals may include, without limitation, receiving the audio signals from an external resources, storing the audio signals, providing the audio signals, and/or other operations. In some implementations, operation 1202 is performed by a managing component the same as or similar to managing component 18 (shown in FIG. 2 and described).

At an operation 1204, an audio synchronization message is received over a communication network. The audio synchronization message includes information related to the timing of a visual component of the multimedia presentation and/or other media component. The communication network may be an ethernet network. In some implementations, operation 1204 may be performed by a receiving component same or similar to receiving component 20 (shown in FIG. 2 and described).

At an operation 1206, an audio output signal synchronized with the visual component of the multimedia presentation is generated. The audio output signal is generated based on the received audio synchronization message. In some implementations, operation 1206 may be performed by a signal generating component the same or similar to signal generating component 22 (shown in FIG. 2 and described).

At an operation 1208, the synchronized audio output signal is provided to one or more audio playback devices. The synchronized audio output signal is provided over the same communication network. In some implementations, operation 1208 may be performed by an output component the same or similar to output component 24 (shown in FIG. 2 and described).

Although the present technology has been described for illustration based on what is considered to be the most practical and preferred implementations, it is to be understood that such detail is solely for that purpose and that the technology is not limited to the disclosed implementations, but, on the contrary, should cover modifications and equivalent arrangements within the spirit and scope of the appended claims. It is to be understood that the present technology contemplates that, to the extent possible, one or more features of any implementation can be combined with one or more features of any other implementation.

What is claimed is:

1. A system for generating synchronized audio output signals, the system comprising:
   one or more audio synchronization computing platforms configured to:
      manage audio signals related to an audio component of a multimedia presentation, receive an audio synchronization message that includes information related to the timing of a video signal, the video signal being related to a visual component of the multimedia presentation, the audio synchronization message being received over a communication network;
      generate an audio output signal synchronized with the video signal of the visual component of the multimedia presentation based on the received audio synchronization message; and
      provide the audio output signal to one or more audio playback devices from the one or more audio synchronization computing platforms, the audio output signal being provided to the one or more audio playback devices over the same communication network, and wherein playback of the audio output signal by the one or more audio playback devices is synchronized with video playback of the video signal; and
   a network synchronization computing platform configured to:
      receive a video synchronization message that includes information related to the timing of the video signal;
      convert the video synchronization message to the audio synchronization message; and
      transmit the audio synchronization message to the one or more audio synchronization computing platforms over the communication network.

2. The system of claim 1, wherein the one or more audio synchronization computing platforms are configured such that generating the audio output signal comprises: receiving one or more audio signals; and
   resampling the one or more audio signals under the audio synchronization message.

3. The system of claim 1, wherein the one or more audio synchronization computing platforms are configured such that the audio synchronization message comprises a timecode signal, wherein the timecode signal includes timing information for individual frames of the video signal.

4. The system of claim 3, wherein the one or more audio synchronization computing platforms are configured such that generating the audio output signal comprises: decoding the timecode to determine frame numbers and sample times for the frames of the video signal;
receiving one or more audio signals; and
resampling the audio signals under the timecode.

5. The system of claim 4, wherein the one or more audio synchronization computing platforms are configured such that resampling the audio signals is performed using matrix multiplication.

6. The system of claim 3, wherein the one or more audio synchronization computing platforms are configured such that the timecode is an SMPTE timecode.

7. The system of claim 1, wherein the network synchronization computing platform is configured such that the video synchronization message is a black-burst signal.

8. The system of claim 1, wherein the communication network is a single ethernet network.

9. A method of generating synchronized audio output signals, the method being implemented in a computer system including one or more physical processors and storage media storing machine-readable instructions, the method comprising:
managing audio signals related to an audio component of a multimedia presentation;
receiving an audio synchronization message that includes information related to the timing of a video signal, the video signal being related to a visual component of the multimedia presentation, the audio synchronization message being received over a communication network;
generating an audio output signal synchronized with the video signal of the visual component of the multimedia presentation based on the received audio synchronization message;
providing the audio output signal to one or more audio playback devices from the one or more audio synchronization computing platforms, the audio output signal being provided to the one or more audio playback devices over the same communication network, and wherein playback of the audio output signal by the one or more audio playback devices is synchronized with video playback of the video signal;
receiving a video synchronization message that includes information related to the timing of the video signal;
converting the video synchronization message to the audio synchronization message; and
providing the audio synchronization message over the same communication network.

10. The method of claim 9, wherein generating the audio output signal comprises:
receiving one or more audio signals; and
resampling the one or more audio signals under the audio synchronization message.

11. The method of claim 9, wherein the audio synchronization message comprises a timecode signal, wherein the timecode signal includes timing information for individual frames of the video signal.

12. The method of claim 11, wherein generating the audio output signal comprises:
decoding the timecode signal to determine frame numbers and sample times for the frames of the video signal;
receiving one or more audio signals; and
resampling the audio signals under the timecode signal.

13. The method of claim 12, wherein resampling the audio signals is performed using matrix multiplication.

14. The method of claim 12, wherein the timecode signal is an SMPTE timecode signal.

15. The method of claim 9, wherein the digital video synchronization message is a black-burst signal.

16. A method of generating synchronized audio output signals, the method being implemented in a computer system including one or more physical processors and storage media storing machine-readable instructions, the method comprising:
managing audio signals related to an audio component of a multimedia presentation;
receiving an audio synchronization message that includes information related to the timing of a video signal, the video signal being related to a visual component of the multimedia presentation, the audio synchronization message being received over a communication network;
generating an audio output signal synchronized with the video signal of the visual component of the multimedia presentation based on the received audio synchronization message;
providing the audio output signal to one or more audio playback devices from the one or more audio synchronization computing platforms, the audio output signal being provided to the one or more audio playback devices over the same communication network, and wherein playback of the audio output signal by the one or more audio playback devices is synchronized with video playback of the video signal; and
wherein the communication network is a single ethernet network.

* * * * *